(12) United States Patent
Ohara et al.

(10) Patent No.: US 6,840,435 B2
(45) Date of Patent: Jan. 11, 2005

(54) METHOD FOR BRAZING ALUMINUM ALLOY-ASSEMBLED ARTICLES WITHIN A SHORT PERIOD OF TIME AND A FILLER ALLOY USABLE AT LOW TEMPERATURE

(75) Inventors: Nobuaki Ohara, Tokyo (JP); Takeyoshi Doko, Tokyo (JP); Masaki Shimizu, Kariya (JP); Satoshi Nohira, Kariya (JP); Hiroshi Nishikawa, Kariya (JP); Hiroshi Ogawa, Kariya (JP)

(73) Assignees: The Furukawa Electric Co., Ltd., Tokyo (JP); Denso Corporation, Aichi (JP)

( * ) Notice: Subject to any disclaimer, the term of this patent is extended or adjusted under 35 U.S.C. 154(b) by 143 days.

(21) Appl. No.: 10/007,797

(22) Filed: Nov. 7, 2001

(65) Prior Publication Data

US 2002/0127135 A1 Sep. 12, 2002

Related U.S. Application Data

(63) Continuation of application No. PCT/JP01/01909, filed on Mar. 12, 2001.

(30) Foreign Application Priority Data

Mar. 10, 2000 (JP) ........................................ 2000-066076
May 26, 2000 (JP) ........................................ 2000-156965

(51) Int. Cl.[7] .......................... B23K 35/22; C22C 21/00
(52) U.S. Cl. .................. 228/262.51; 420/437; 420/540; 228/219; 148/438

(58) Field of Search .......................... 228/262.5, 262.51, 228/219, 223, 207, 245–262, 183; 420/437, 540; 148/438, 416

(56) References Cited

U.S. PATENT DOCUMENTS

5,316,206 A * 5/1994 Syslak et al. ................ 228/183
5,407,124 A * 4/1995 Bose ...................... 228/262.51

FOREIGN PATENT DOCUMENTS

| JP | 03-057588 | 3/1991 |
| JP | 06-226489 | 8/1994 |
| JP | 08-215579 | 8/1996 |

* cited by examiner

Primary Examiner—Roy King
Assistant Examiner—Janelle Morillo
(74) Attorney, Agent, or Firm—Knobbe Martens Olson & Bear LLP

(57) ABSTRACT

A method for brazing aluminum alloy-assembled articles with a filler alloy having a liquidus temperature of 540° C. or lower and a difference of temperature between the liquidus temperature and the solidus temperature being 100° C. or lower, wherein the highest temperature reached in the assembled article at the time of heating for brazing being set 40° C. or more higher than the liquidus temperature but 585° C. or lower. An aluminum alloy-filler alloy usable at low temperature for brazing, which comprises Si in an amount of 4.0 wt % to 8.0 wt %, Zn in an amount of 7.0 wt % to 20.0 wt % and Cu in an amount of 10.0 wt % to 35.0 wt %, with the balance being made of aluminum.

3 Claims, 11 Drawing Sheets

METHOD FOR BRAZING ALUMINUM ALLOY-ASSEMBLED ARTICLES WITHIN A SHORT PERIOD OF TIME AND A FILLER ALLOY USABLE AT LOW TEMPERATURE

This is a continuation of PCT Application PCT/JP01/01909, filed Mar. 12, 2001. The prior PCT application was not published in English under PCT Article 21(2).

FIELD

This invention relates to a method for brazing an aluminum alloy-assembled article within a short period of time wherein a heating time for brazing is significantly shortened, and to filler alloy usable at low temperature and excellent in corrosion resistance.

BACKGROUND

From the past, a brazing method for aluminum alloy-assembled articles has adopted a process wherein an assembled article is formed with a brazing sheet composed of a core alloy (an alloy of Al—Mn series) both surfaces of which has been clad with a filler alloy of Al—Si series or one of the surfaces of which has been clad with a sacrificial material (an alloy of Al—Zn series) and the other surface of which has been clad with a filler alloy (an alloy of Al—Si series), and integrated in a furnace by heating the article at a temperature around 600° C. exceeding the melting point (liquidus temperature) of the filler alloy. According to this brazing method, a number of positions can be brazed at the same time. Then it is an established industrial method for manufacturing various products including a core for a heat exchanger, as shown for example in FIG. 1. This brazing method is classified to a vacuum brazing method wherein Mg is added to a filler alloy and it is heated in a vacuum furnace for brazing thereby an oxide film on the surface of Al is destroyed by evaporation of Mg and the getter function, and the NB method (CAB method) wherein non-corrosive flux is used and brazing is carried out in a furnace in nitrogen gas atmosphere.

The heat-exchanger core is constructed, as shown in FIG. 1, by a tube 1 for passing a cooling medium, a corrugated fin 2 for use in heat radiation (referred to hereinafter conveniently as fin) brazed between the tubes 1, a header pipe 3 and a pipe 4 for supplying or discharging a cooling medium, an end cap 5 blocking the upper end or the lower end of the header pipe 3, and side plates 6 fixing between the two header pipes 3. The aforesaid brazing sheet is used as the tube 1 and the tube 1 and the fin 2 are brazed.

In a brazing method using the aforesaid Al—Si series filler alloy, however, a plurality of assembled articles is set in a furnace and the whole of the individual assembled articles is maintained for 3 minutes at a temperature of about 600±5° C. As it takes much time for elevation of temperature especially from about 550° C., a time of 30 minutes to 1 hour is required for brazing of 1 cycle. For example, a heating time for brazing a core for a heat exchanger as shown in FIG. 1 required indeed 46 minutes per cycle as shown in FIG. 10, the following problems have arisen as the brazing temperature is as high as about 600° C.

Namely, (1) at the time of brazing, Zn in a sacrificial material (an alloy of Al—Zn series) constructing aluminum brazing sheet is diffused to a core alloy (an alloy of Al—Mn series) so that the anti-corrosive property of the core alloy has been deteriorated. (2) At the time of brazing, Mn deposition in the core alloy has been formed a solid solution again so that thermal conductivity of the core alloy is deteriorated to damage thermal characteristics of the heat exchanger. (3) Alloy elements such as Cu and Mg effective for enhancing strength allows the solidus temperature to drop lower than the brazing temperature so that they cannot be added to the core alloy. In addition, Mg is diffused onto the surface of the brazing sheet to deteriorate the function of flux at the time of brazing. (4) A recycled material of an aluminum heat exchanger contains 2 to 5 wt % of Si and depresses the solidus temperature to lower than the brazing temperature so that it is hardly used as core material.

Thus, the conventionally used filler alloy usable at high temperature involved various problems. However, it has been found that these problems can be solved by depressing the melting point of the filler alloy. Especially, if the brazing temperature can be depressed to about 540° C., melting of the filler alloy and the formation of fillet will rapidly be made to shorten the working time. Thus, filler alloy usable at low temperature composed of Al—Si—Zn—Cu alloy has been proposed (JP-A-3-57588 ("JP-A" means unexamined published Japanese patent application)). However, the filler alloy had a problem that it did not have a sufficient corrosion resistance.

Other and further features and advantages of the invention will appear more fully from the following description, taken in connection with the accompanying drawings.

DISCLOSURE OF THE INVENTION

The present inventors have made extensive research for the reason that sufficient anti-corrosive property cannot be obtained in the conventional filler alloy usable at low temperature, and as the result, found that in the filler Cu capable of making corrosion potential higher to enhance anti-corrosive property forms a compound with Si contained in a large amount (8.0 wt % or more), thus inhibiting the effect of Cu. Further, based on the finding the present inventors have accomplished the present invention as a result of further research.

The present invention includes:

(1) A method for brazing aluminum alloy-assembled articles within a short period of time, which comprises brazing aluminum alloy-assembled articles with a filler alloy having a liquidus temperature of 540° C. or lower and a difference of temperature between the liquidus temperature and the solidus temperature being 100° C. or lower, wherein the highest temperature reached in the assembled articles at the time of heating for brazing is set 40° C. or more higher than the liquidus temperature but 585° C. or lower, (2) The method for brazing aluminum alloy-assembled articles within a short period of time according to the aforesaid item (1), wherein elevation of the temperature after exceeding the liquidus temperature is continued without keeping the article at a fixed temperature, (3) The method for brazing aluminum alloy-assembled articles within a short period of time according to the aforesaid item (1) or (2), wherein a vacuum brazing method or the NB method is carried out in nitrogen gas atmosphere with flux of Cs series as non-corrosive flux, (4) The method for brazing aluminum alloy-assembled articles within a short period of time according to any one of the aforesaid items (1) to (3), wherein an alloy selected from the group consisting of (a) a Zn alloy containing 4.0 wt % of Al, (b) a Zn alloy containing 11.0 wt % of Al and 3.0 wt % of Cu, and (c) an Al alloy containing 6.0 wt % of Si, 25.0 wt % of Cu, and 5.0 wt % of Zn is used as the filler alloy, (5) An aluminum alloy-filler alloy usable at low temperature for brazing, which comprises Si in an amount of 4.0 wt % or more but less than 8.0 wt %, Zn in an amount of 7.0 wt % or more but 20.0 wt % or less and Cu in an amount of 10.0 wt % or more but 35.0 wt % or less, with the balance being made of aluminum and any unavoidable impurities, and (6) An aluminum alloy-filler alloy usable at low temperature for brazing, which comprises Si in an amount of 5.0 wt % or more but less than 7.0 wt %, Zn in an amount of 9.0 wt % or more but 20.0 wt % or less and Cu in an amount of 19.0 wt % or more but 27.0 wt.% or less, with the balance being made of aluminum and any unavoidable impurities.

BEST MODE FOR CARRYING OUT THE INVENTION

Figure 1:
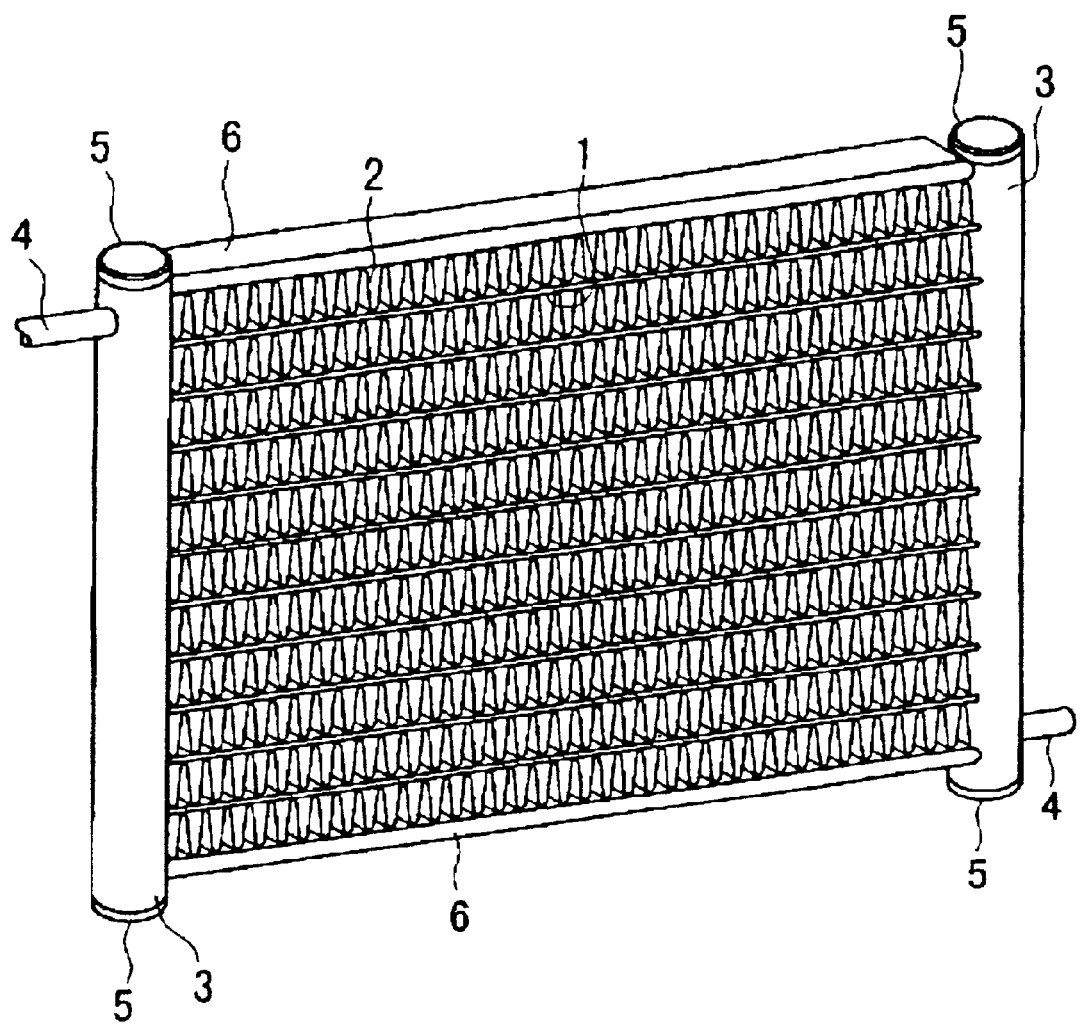
FIG. 1 is a perspective view showing an example of a core for a heat-exchanger.

Below is a description of the filler alloy as stated in the foregoing (6) and (7) of the invention.

A filler alloy usable at low temperature of the present invention for brazing an Al alloy is an Al base material incorporated with adequate amount of Si, Zn and Cu to depress the melting point of the filler alloy. Making corrosion potential lower (deterioration of anti-corrosive property) by Zn as described above is inhibited by incorporation of an adequate amount of Cu capable of making corrosion potential higher while the content of Si, which inhibit the aforesaid effect of Cu, is suppressed to less than 8.0 wt %.

In the present invention, the reason why the content of Si is limited to an amount of 4.0 wt % or more but less than 8.0 wt %, preferably 5.0 wt % or more but 7.0 wt % or less is that if the amount is less than 4.0 wt %, the melting point of the filler alloy is not sufficiently depressed, while the amount of 8.0 wt % or more inhibits the effect of Cu capable of making corrosion potential higher, thus failing to obtain sufficient anti-corrosive property.

The reason why the content of Zn is limited to an amount of 7.0 to 20.0 wt %, preferably 9.0 to 20.0 wt % is that if the amount is less than 7.0 wt %, the melting point of the filler alloy is not depressed sufficiently, while the amount exceeding 20.0 wt % makes the corrosion potential lower significantly so that the corrosion potential is hardly restored even if Cu is contained.

The reason why the content of Cu is limited to an amount of 10.0 to 35.0 wt %, preferably 19.0 to 27.0 wt % is that if the amount is less than 10.0 wt %, the melting point of the filler alloy is not depressed sufficiently and reduction of corrosion potential by Zn can sufficiently be inhibited, while the amount exceeding 35.0 wt % forms an intermetallic compound in the filler alloy to make the brazed portion brittle.

According to the brazing method of the present invention, the heating time for brazing can remarkably be shortened thereby to attain industrially significant effect. Additionally, the filler alloy usable at low temperature of the present invention contains an adequate amount of Cu capable of increasing corrosion potential in rivalry with Zn capable of making corrosive potential lower and suppresses the content of Si which inhibits the effect of Cu to less than 8.0 wt % so that anti-corrosive property of the filler alloy according to the present invention is excellent and good brazing property is stably obtained even under corrosive circumstances. Since the brazing temperature can be depressed, various problems encountered in a filler alloy usable at high temperature can wholly solved, such as the problem of diffusion of Zn in a sacrificial material of a brazing sheet into a core alloy to deteriorate anti-corrosive property of the core alloy. Further, working time for brazing can be shortened to achieve industrially remarkable merits.

In the method of the present invention, a filler alloy wherein the liquidus temperature is 540° C. or lower and a difference between the liquidus temperature and the solidus temperature is 100° C. or lower can be used as a filler alloy.

In the present invention, the reason why the liquidus temperature of a utilizable filler alloy is limited to 540° C. or lower is that the gist of the present invention is realized, which resides in setting the highest temperature reached on brazing at a temperature by 40° C. or more higher than the liquidus temperature of the filler alloy but 585° C. or lower.

In case the liquidus temperature of the filler alloy exceeds 540° C., for example, a temperature obtained by adding 40° C. to the liquidus temperature will exceed 580° C. so that a difference from 585° C., which is the highest temperature reached, and the obtained temperature is lower than 5° C. Thus, rapid heating cannot be carried out to suppress the temperature to the above difference of the temperatures so that the productivity can hardly be increased.

The aforesaid gist of the present invention, i.e. the reason why the highest temperature reached at the time of heating for brazing being set 40° C. or more higher than the liquidus temperature but 585° C. or lower will be described hereinafter.

A filler alloy having a liquidus temperature of 540° C. or lower is employed in the present invention. However, the larger a difference between the higher limit temperature of 585° C. of the highest temperature reached, at the time of heating for brazing and the liquidus temperature becomes, the more advantageously rapid heating can be carried out to enhance the productivity further. In particular, the filler alloy having a liquidus temperature of 525° C. or lower is recommendable.

In the past, brazing of aluminum alloy-assembled articles were carried out by using a filler alloy usable at high temperature wherein a difference between the liquidus temperature and the solidus temperature is about 40° C. at maximum (for example, JIS 4045 alloy having a liquidus temperature of 590° C. and a solidus temperature of 577° C.) and brazing at a temperature of about 600° C. In such conventional method, however, a portion of the assembled article where the temperature is kept higher is exposed for a long period of time to high temperature liquid phase since the temperature exceeds the solidus temperature, so that diffusion of the filler takes place. In the conventional method, such diffusion of the filler was prevented by reducing the elevating velocity of the temperature at the time of heating for brazing to make distribution of temperature in every portion of the assembled article smaller.

Contrary to the conventional method, the present invention employs a filler alloy having a liquidus temperature of 540° C. or lower so that the brazing temperature can be lowered to cause hardly any filler diffusion. In the present invention, the heating velocity at the time of heating for brazing is increased to make distribution of temperature in the assembled article larger whereby fillets (shape of filler in the brazing portion) are not uniformly formed in the assembled article as whole. In the present invention, therefore, the aforesaid difference in temperature is limited to 100° C. or lower. Especially, a temperature of 70° C. or lower is preferable.

In the present invention, a difference between the liquidus temperature and the solidus temperature of the filler alloy used is limited as 100° C. or lower. A filler alloy having this difference of temperature was employed even in the conventional method. However, the conventional brazing method is quite different from the brazing method in short time of the present invention in brazing temperature and in temperature characteristics of the filler alloy. In addition, the technical idea is different as described above between both methods.

A necessary heating time in the present invention can properly be selected according to the filler alloy used. A time of about 10 minutes to about 40 minutes is sufficient, especially a time of about 15 to 35 minutes is preferable. The time can significantly be shortened as compared with the conventional example.

The filler alloy used in the method of the present invention is selected from the conventionally known filler alloys such as Zn series, Sn series, Zn—Al series, Zn—Al—Sn series, Al—Si—Cu—Zn series, and Al—Cu—Zn series. A filler alloy of Al—Si—Cu—Zn series is preferable. If the alloy becomes eutectic according as the alloy composition, the eutectic temperature is defined as the solidus temperature. Characteristics other than the temperature characteristics may be selected according to the demand of each product.

In the present invention, the core alloy coated with the filler alloy according to a rolling method (brazing sheet) is employed. If the roll coating to the core alloy is difficult, a method wherein a given portion is coated with a filler alloy by hot dipping or thermal spraying, a method wherein a given portion is precoated with a powdery filler alloy by a binder, a method wherein a given portion is applied with a paste-like material of a powdery filler alloy or the like method can be also applied.

The present invention is a brazing method for in short-time which comprises using a filler alloy having a low liquidus temperature and defining the highest temperature reached in assembled article to be brazed at a temperature by 40° C. or more higher than the liquidus temperature but at a temperature 585° C. or lower to shorten the heating time for brazing thereby enhancing productivity. The gist of the method is that the highest temperature reached at 40° C. or more higher than the liquidus temperature of the filler alloy. By the term "liquidus temperature" is meant a temperature at which the filler alloy is completely molten so that the filler alloy beyond this temperature is completely in the form of a liquid phase. By defining the highest temperature reached in the assembled article at 40° C. or more higher than the liquidus temperature of the filler alloy, a rapid heating for enhancing productivity becomes possible.

Individual portions of the assembled article heated for brazing are different in temperature during heating for brazing. In other words, dispersion in temperature takes place all over the assembled article. A rapid heating is effective for shortening the heating time for brazing. However, the rapid heating permits the dispersion in temperature in assembled article wider. If this dispersion in temperature is regarded as a time interval from a stage that, in heating for brazing, the filler has been molten in a portion where the temperature of the portion most easily tends to be elevated in the assembled article to a stage that the filler has been molten in a portion where the temperature of the portion most hardly tends to be elevated, the filler molten first is longer in fluidized time in case of the time interval is long, so that fillets are not uniformly formed, and in the extreme case, strain forms in the resultant product to cause dimensional abnormality in the product.

Figure 2A:
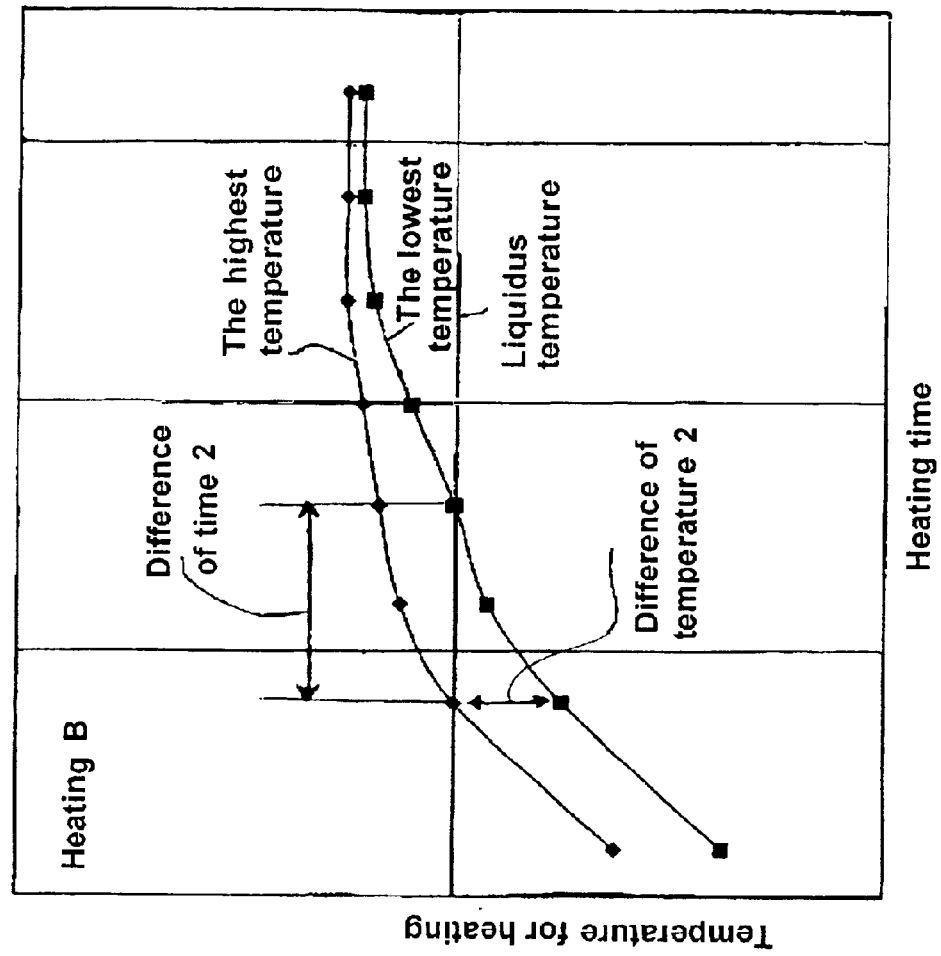
FIG. 2(a) and FIG. 2(b) each is an explanatory diagram showing that the heating time can be shortened according to the present invention.

In the present invention, because the highest temperature reached in the assembled article is set at 40° C. or more higher than the liquidus temperature of the filler alloy, a period of time from a stage that the filler has been molten in a portion of the assembled article where the temperature of the portion most easily tends to be elevated to a stage that the filler has been molten in a portion where the temperature of the portion most hardly tends to be elevated can be shortened. Referring to FIGS. 2(a) and (b), this point will be explained concretely.

Figure 2B:
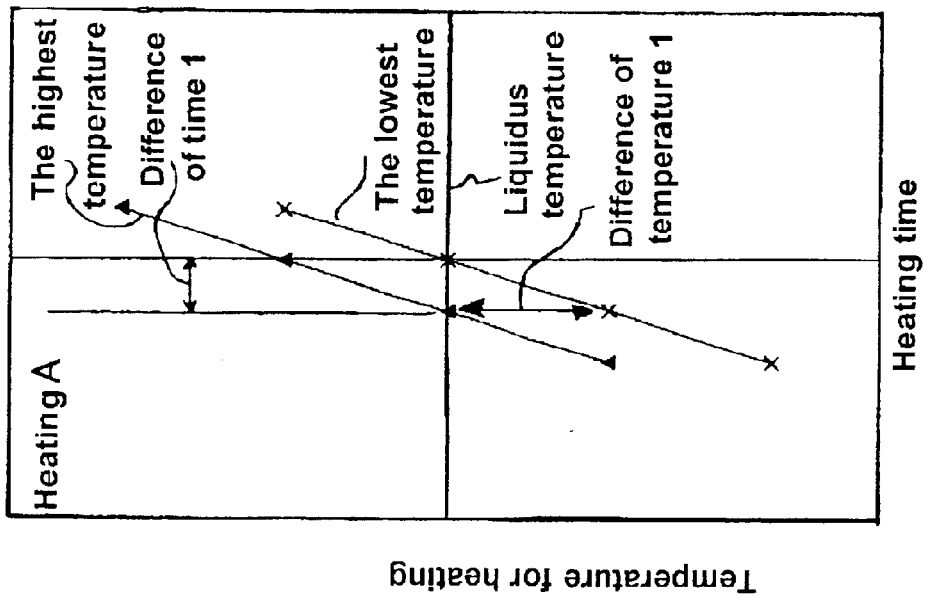

FIG. 2(a) (Heating A) is a pattern of the temperature showing the case of setting the highest temperature reached at a temperature which is 40° C. or more higher than the liquidus temperature of a filler alloy while FIG. 2(b) (Heating B) a pattern of the temperature showing the case of setting the highest temperature reached at a temperature which is higher than the liquidus temperature by less than 40° C. A difference of the temperature in the assembled article is smaller in case of the Heating B (comparison on the difference of the temperature 1 with the difference of the temperature 2), whereas a time period from a stage that the highest temperature has reached the liquidus temperature to a stage that the lowest temperature has reached the liquidus temperature is by contraries shorter in case of the Heating A (comparison of the difference of time 1 with the difference of time 2). In view of FIGS. 2(a) and (b), it is understood that a time period from a stage that the filler in a portion of the assembled article where the temperature of the portion most easily tends to be elevated has been molten to a stage that the filler in a portion where the temperature of the portion most hardly tends to be elevated has been molten can be shortened by setting the highest temperature reached in the assembled article at a temperature by 40° C. or more higher than the liquidus temperature of a filler alloy.

It is further added that in case a difference of the temperature between the highest temperature reached in the assembled article and the liquidus temperature of a filler alloy is lower than 40° C., rapid heating will result in that sufficient heating is not carried out in a portion of the article where the temperature hardly tends to be elevated, so that there may be formed a portion where brazing has not been made. This is an additional reason that the highest temperature reached in the assembled article is set at a temperature by 40° C. or more higher than the liquidus temperature of a filler alloy.

In the present invention, the reason why the highest temperature reached in the assembled article to be brazed is limited to 585° C. or lower is that if the temperature exceeds 585° C., unique effects due to the brazing at low temperature, such as prevention of filler diffusion, increase in anti-corrosive property, increase in strength, increase in thermal conductivity, cannot be obtained sufficiently. In particular, the effect for prevention of filler diffusion is important. Namely, in the present invention, because the highest temperature reached in the assembled article is set at a temperature by 40° C. or more higher than the liquidus temperature of a filler alloy, the filler alloy molten at the liquidus temperature of the filler alloy is, while further heating at 40° C. or more higher than that temperature, existing in molten state so that filler diffusion is caused. To inhibit the filler diffusion, the present invention defines the highest temperature reached in the assembled article at a temperature as low as 585° C. or lower. Especially recommended, as the highest temperature reached is 575° C. or lower. It follows that a filler alloy having a liquidus temperature 530° C. or lower is used in this case.

The present invention is a brazing method in short time wherein dispersion in the temperature and time in the assembled article is largely permitted for enhanced productivity so that rapid heating is possible within the range where the temperature condition defined in the present invention is satisfied. In the present invention, it is no matter where elevation of the temperature is continued without keeping a fixed temperature after the temperature in the assembled article has exceeded the liquidus temperature. On the other hand, it is desired to keep the assembled article at the liquidus temperature or more for one minute or more after the temperature in the assembled article has exceeded the liquidus temperature so as to flow the filler to form fillets sufficiently even in a portion of the assembled article where the temperature hardly tends to be elevated.

In the present invention, any of the brazing methods can be applied, such as the NB method wherein non-corrosive flux is used, a brazing method wherein usual flux is used, a vacuum brazing method and the like. Especially, the aforesaid NB method is recommended in aspect of productivity. In this case, it is preferred to use flux of Cs series. As an aluminum alloy, any of the aluminum alloy capable of imparting necessary characteristics to the produced structure manufactured by brazing can be used.

EXAMPLE

The present invention is described in more detail based on the following examples with comparative examples, but the invention is not limited to those.

Example 1

A core for heat-exchanger as shown in FIG. 1 was assembled and heated for brazing under the temperature conditions defined by the brazing method of the present invention.

A 1050 alloy plate having a thickness of 1.6 mm and a width of 16 mm was used as tube 1, a 3003 alloy plate to which 1% of Zn had been added having a plate thickness of 0.07 mm and a width of 16 mm was used as a fin 2, a 3003 alloy plate having a plate thickness of 1.2 mm was used as a header pipe 3, a 3003 alloy plate having a thickness of 1 mm was used as a pipe 4, a 3003 alloy plate having a thickness of 1 mm was used as an end cap 5, and a 3003 alloy plate having a thickness of 1.2 mm was used as a side plate 6. In the header pipe 3, holes were processed for thrusting the tube 1 or pipe 4 therein.

The tube 1 and the side plate 6 were previously precoated with powders of a filler alloy as shown in Table 1 (the powders having average particle size of 35 μm prepared according to the atomizing method) by the aid of an organic binder. A joint portion of the header pipe 3 and the end cap 5 as well as a joint portion of the header pipe 3 and the pipe 4 was applied after assembling the article, with a paste-like material which consist of powder of a filler alloy as shown in Table 1 and a water-soluble resin. Flux of Cs series was applied and brazing was carried out in nitrogen gas atmosphere. The liquidus temperature and the solidus temperature of each filler alloy were measured with thermal analyses.

Comparative Example 1

A core for heat-exchanger was assembled and brazed in the same manner as described in Example 1 except that the heating for brazing was carried out outside the temperature condition defined in the present invention. An assembled core of a heat-exchanger was also heated for brazing according to the conventional method.

Concerning each of cores for the heat-exchanger brazed in Example 1 and Comparative Example 1, (1) checking of absence or presence of any dimensional abnormality of the core as a whole due to strain, (2) decision by observation of appearance on absence or presence of any destruction of fins in a joint portion of the fins and a tube due to filler diffusion, (3) investigation according to a pressure resistance test on absence or presence resistance of any leakage in a joint portion of the header pipe and the tube, and (4) measurement of a brazing rate of the fins by taking the core for heat-exchanger into pieces, were carried out. The fins were peeled off from the tube whereby those completely brazed were evaluated as a brazing rate of 100%, and those having unbrazed portions were evaluated as brazing rate (%) in terms of a percent of [length of the brazed portion/(length of the brazed portion+length of the unbrazed portion)].

The composition and the temperature characteristics of the filler alloy, and the results of investigation on the core for heat-exchanger are shown in Table 1 and Table 2, respectively. The each patterns of temperature of the highest temperature and the lowest temperature in the core for heat-exchanger at the time of heating for brazing are shown in FIGS. 3 to 10.

TABLE 1

| Classification | Filler alloy No. | Filler alloy %: wt % | ① Liquidus temperature ° C. | ② Solidus temperature ° C. | ①-② ° C. |
|---|---|---|---|---|---|
| Example according to this invention | A | Zn-4%Al | 387 | 381 | 6 |
| | B | Zn-11%Al-3%Cu | 423 | 382 | 41 |
| | C | Al-6%Si-25%Cu-5%Zn | 530 | 523 | 7 |
| Comparative example | D | Zn-40%Sn | 360 | 199 | 161 |
| | E | Al-9%Si-14%Cu | 558 | 523 | 35 |
| Conventional material | F | Al-10%Si (JIS4045 alloy) | 590 | 577 | 13 |

(Note)
Each amount of the impurity element is 0.5 wt % or less

TABLE 2

Figure 3:
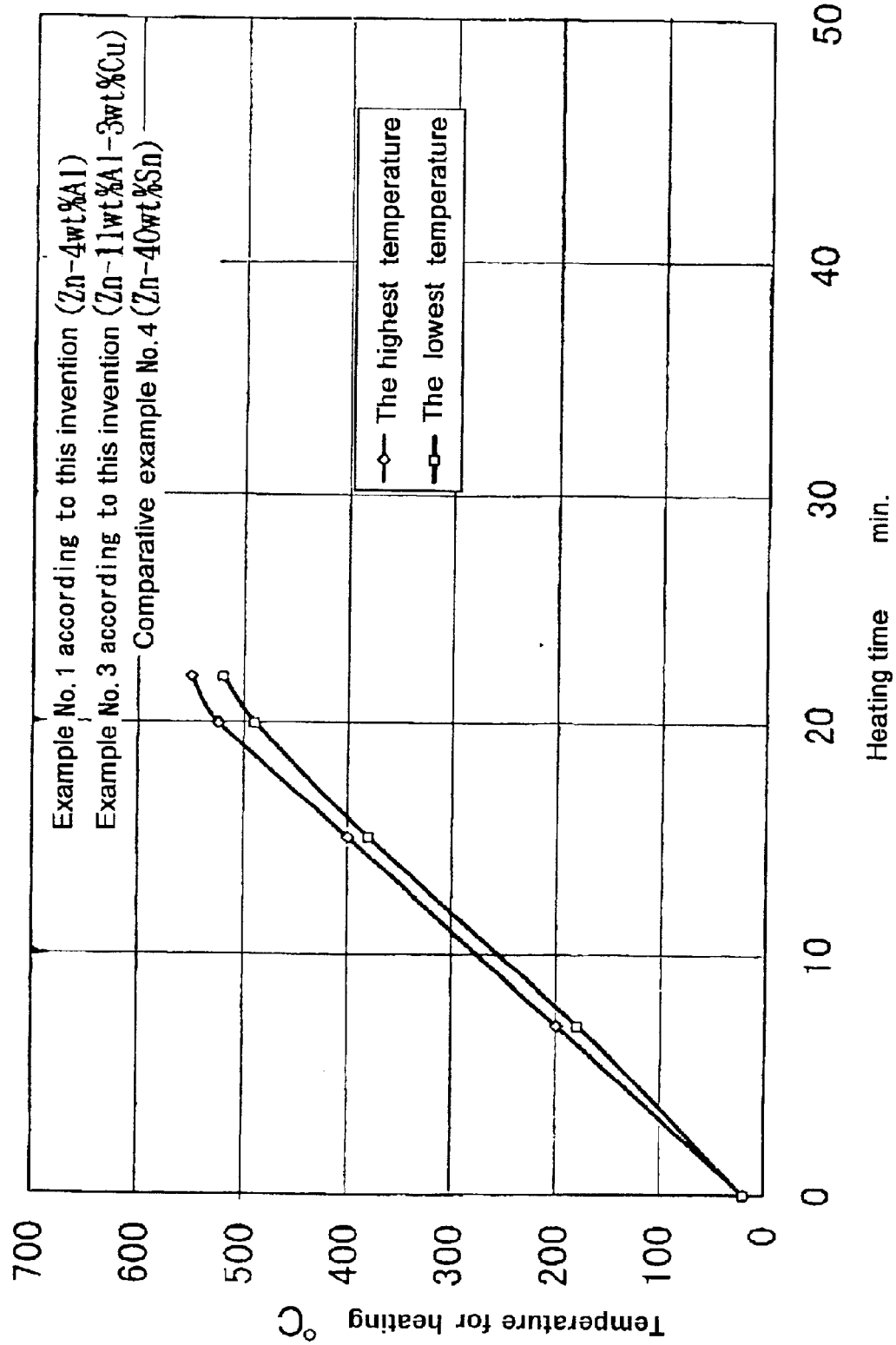
FIG. 3 is a temperature pattern in Examples Nos. 1 and 3 according to the present invention in case of heating for brazing a core for a heat-exchanger.
Figure 4:
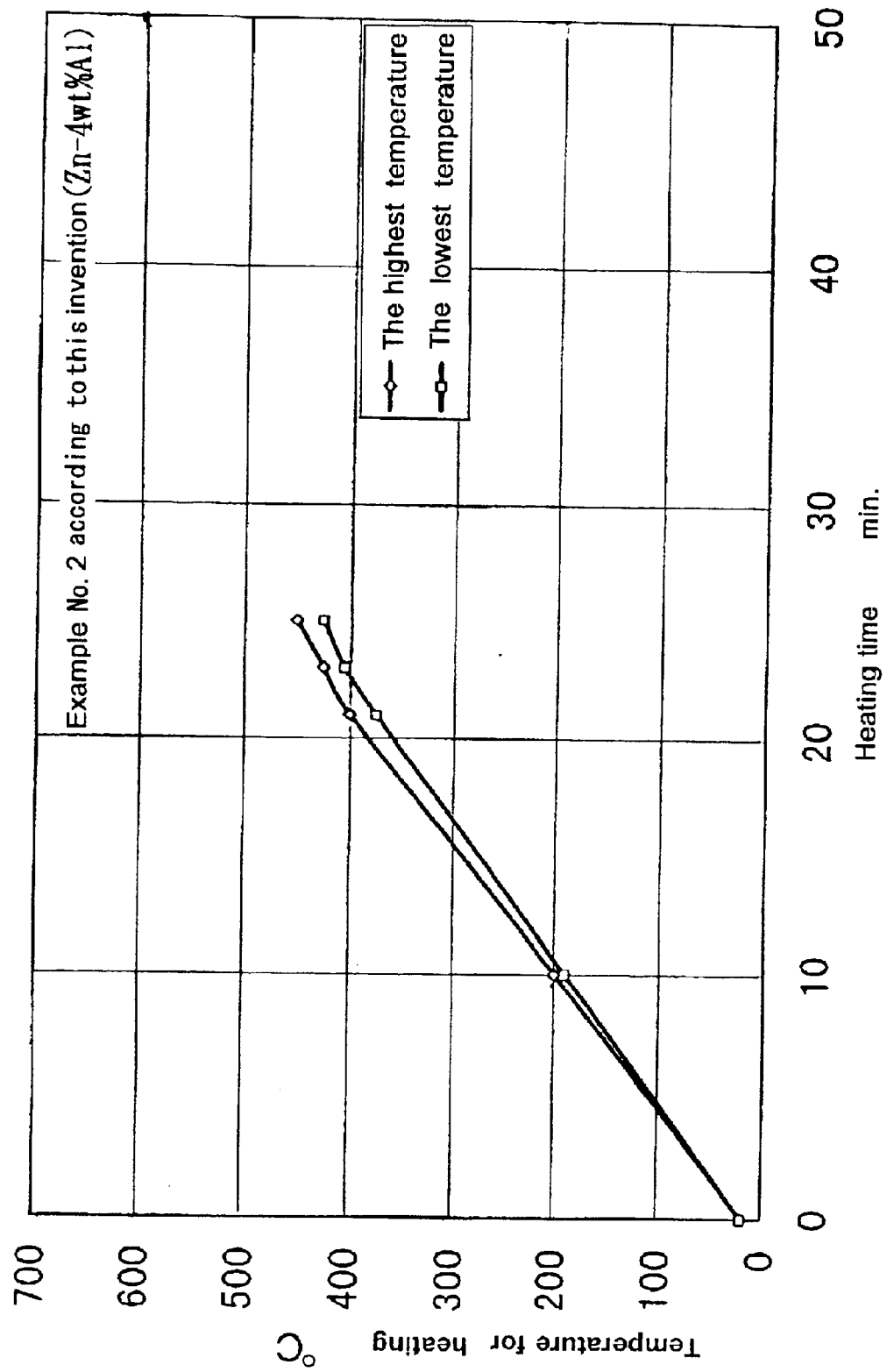
FIG. 4 is a temperature pattern in Example No. 2 according to the present invention in case of heating for brazing a core for a heat-exchanger.
Figure 5:
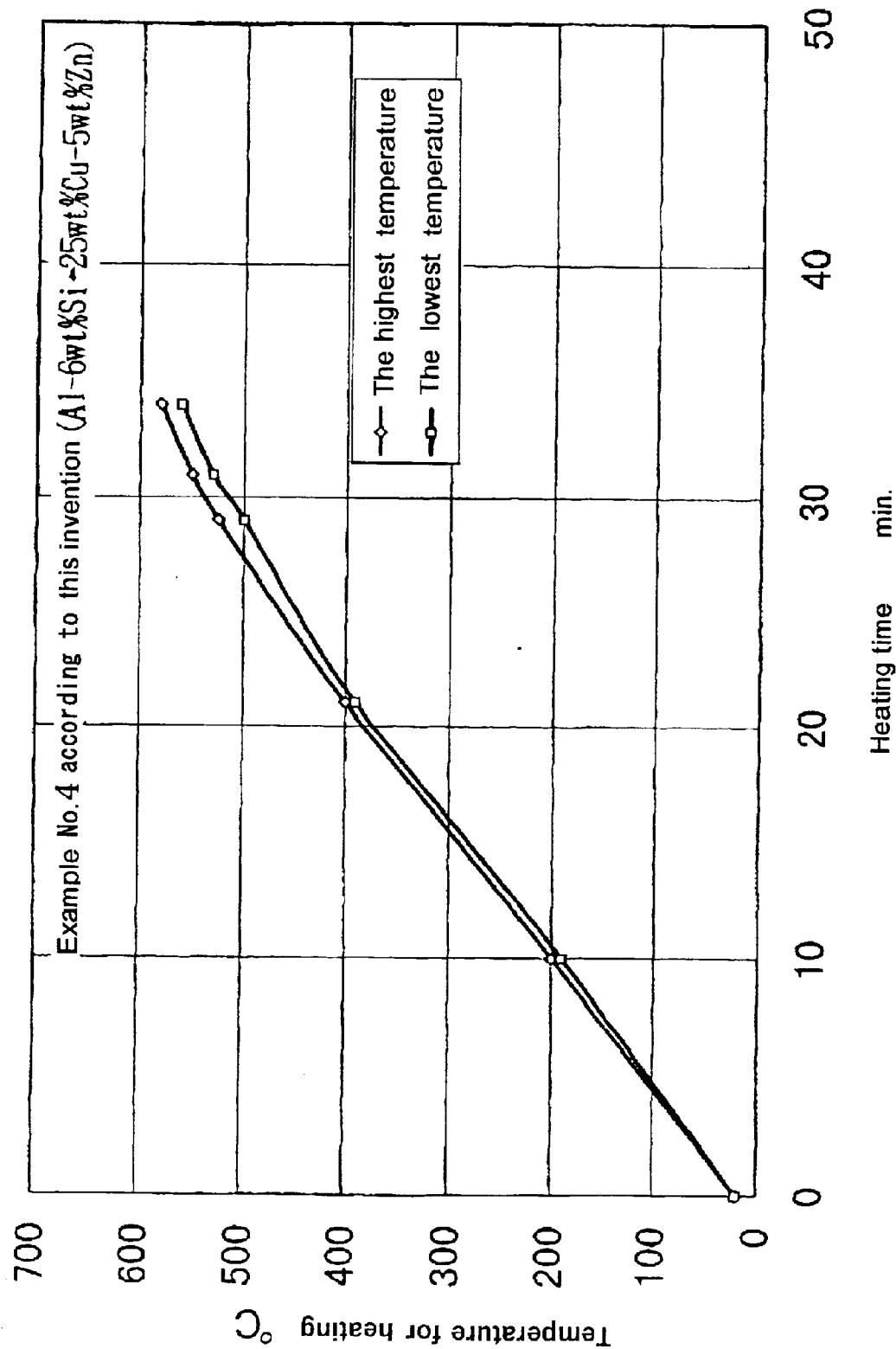
FIG. 5 is a temperature pattern in Example No. 4 according to the present invention in case of heating for brazing a core for a heat-exchanger.
Figure 6:
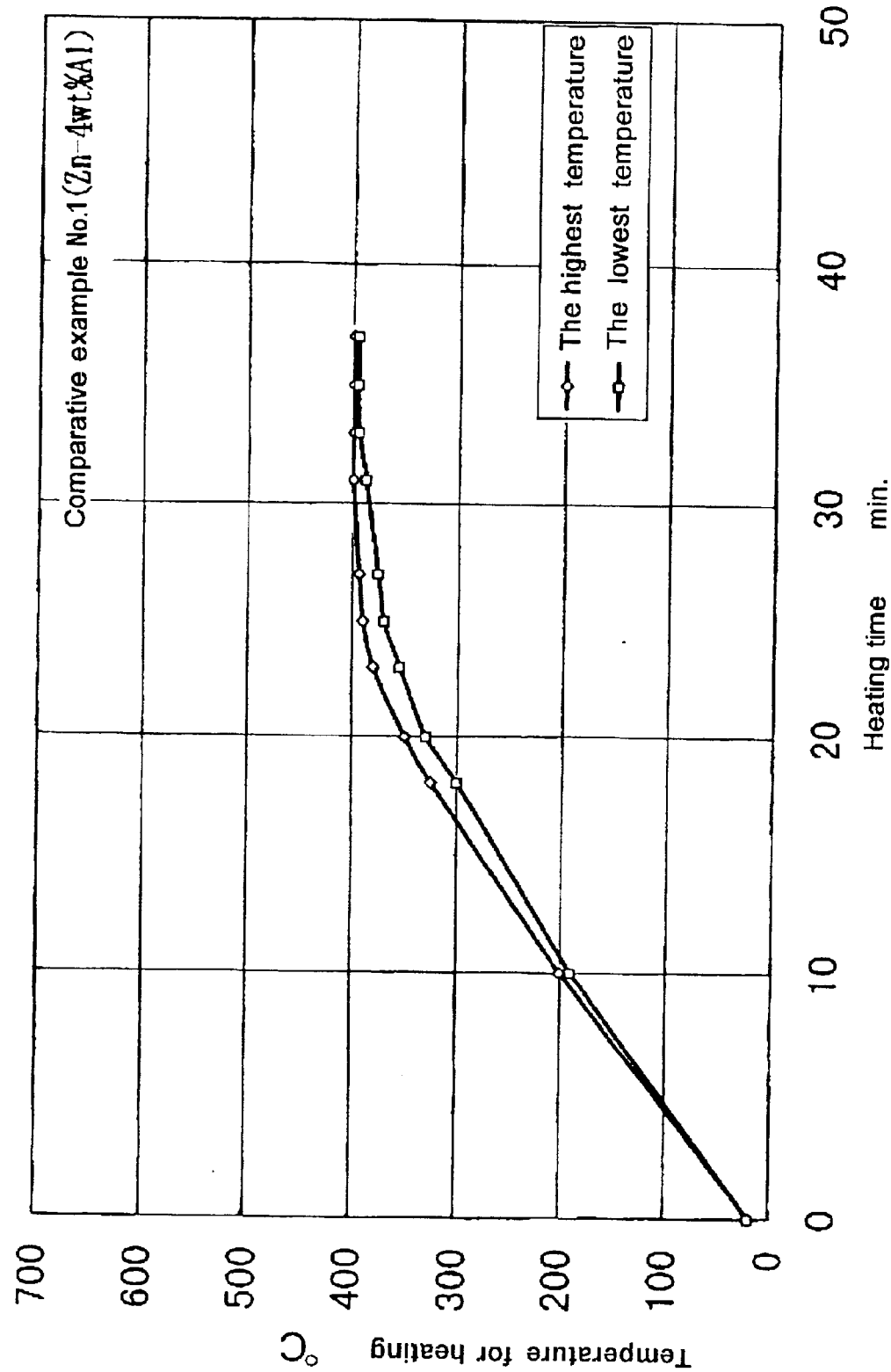
FIG. 6 is a temperature pattern in Comparative Example No. 1 in case of heating for brazing a core for a heat-exchanger.
Figure 7:
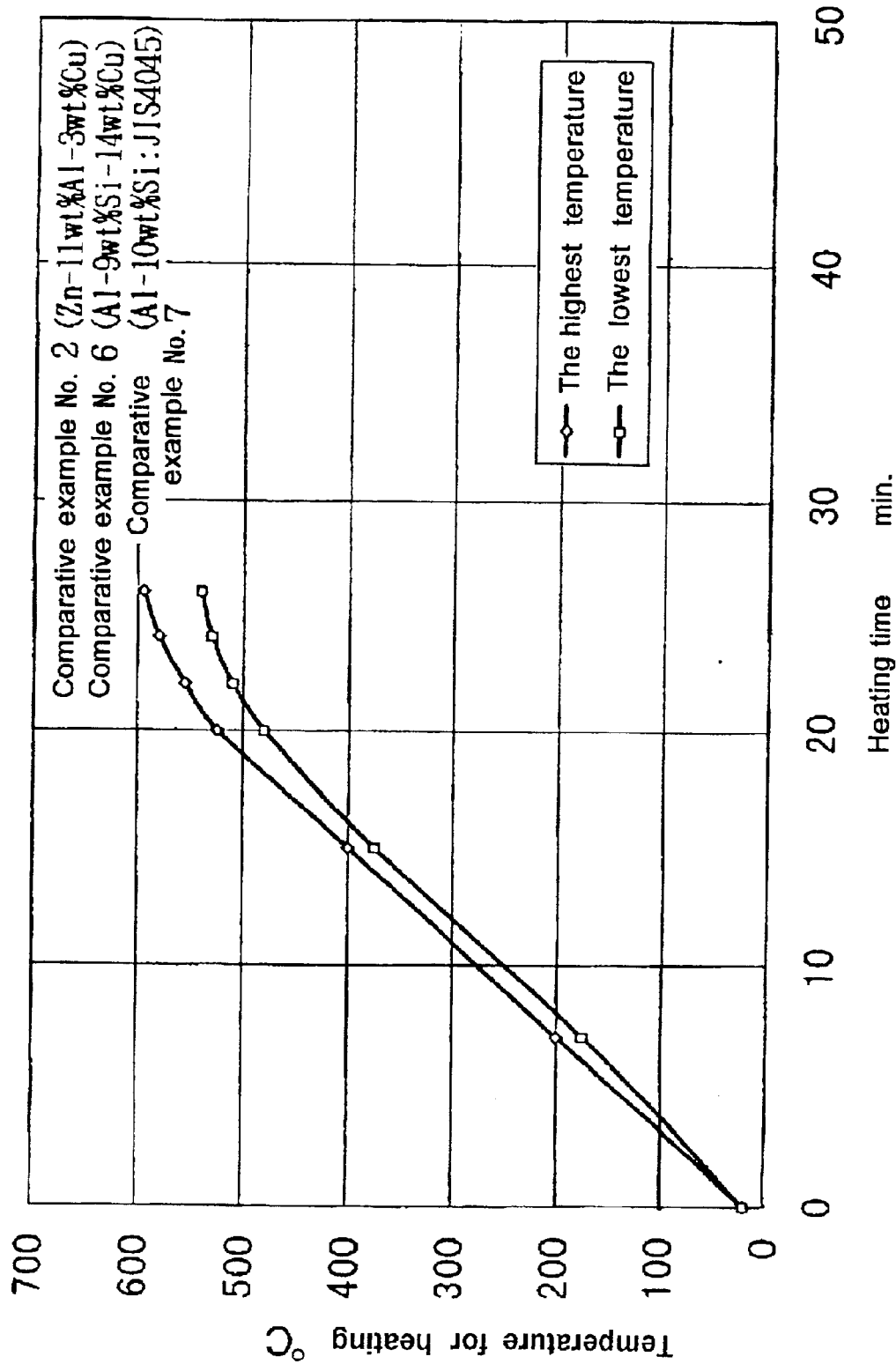
FIG. 7 is a temperature pattern in Comparative Examples Nos. 2, 6 and 7 in case of heating for brazing a core for a heat-exchanger.
Figure 8:
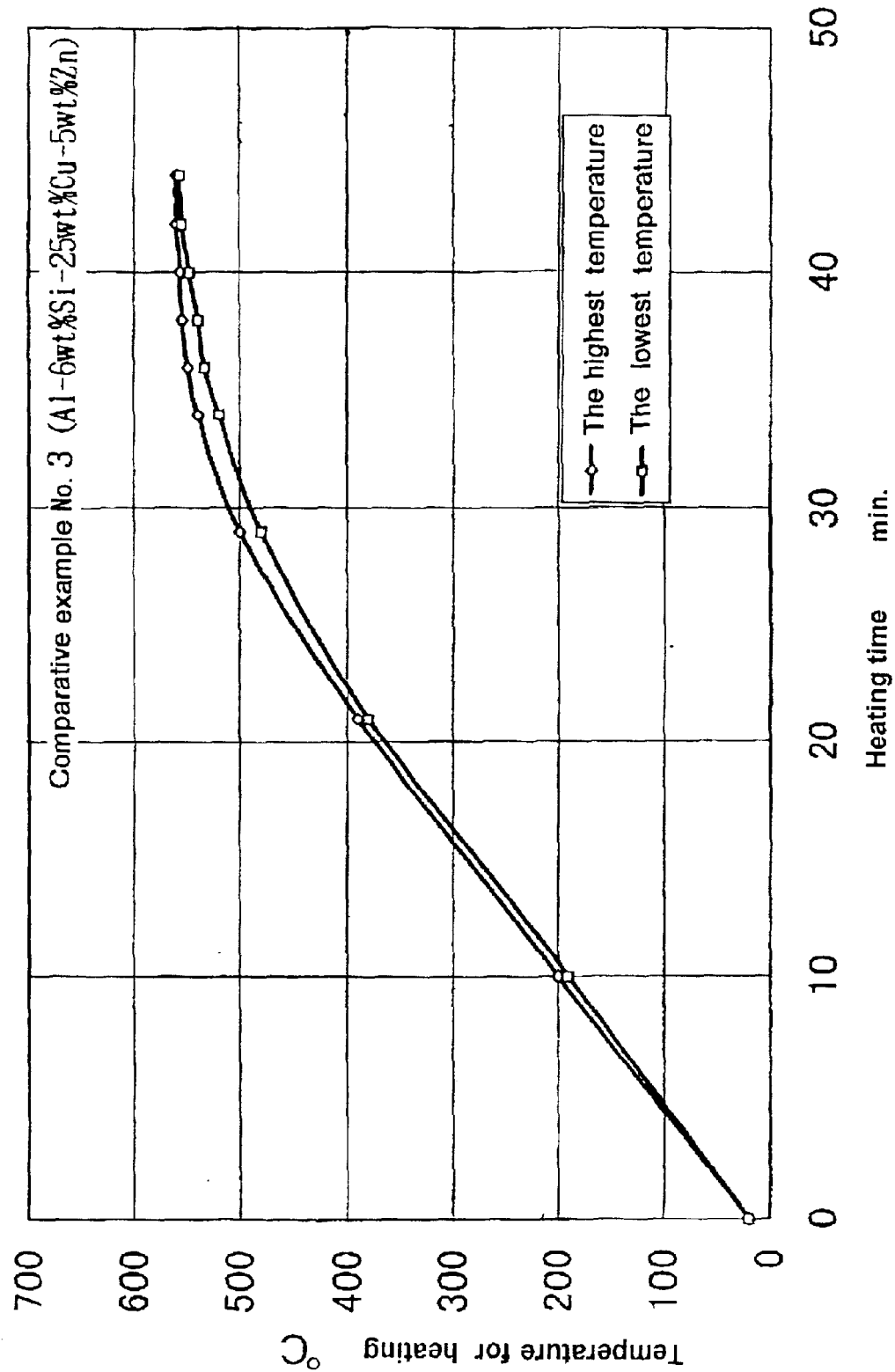
FIG. 8 is a temperature pattern in Comparative Example No. 3 in case of heating for brazing a core for a heat-exchanger.
Figure 9:
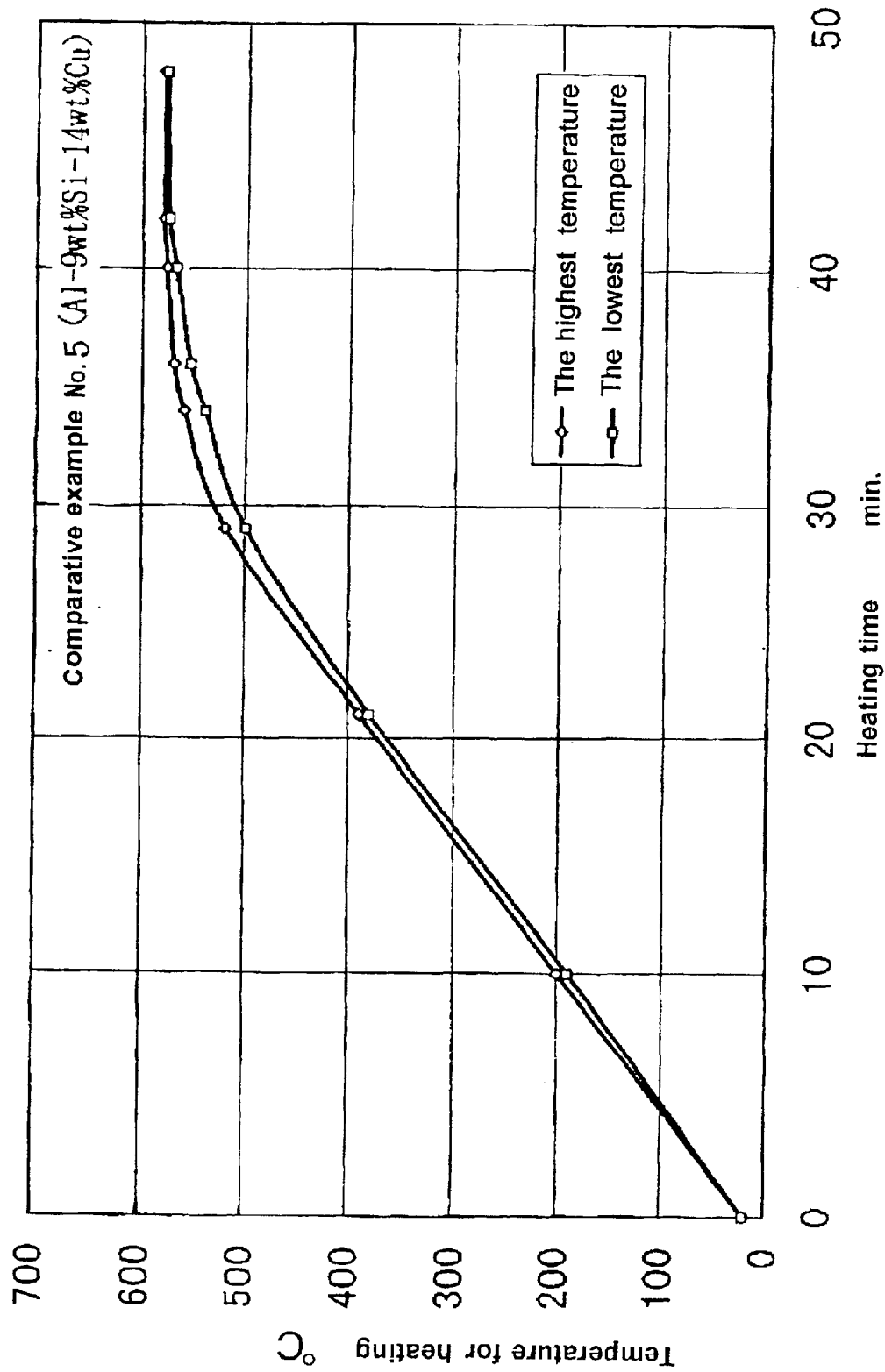
FIG. 9 is a temperature pattern in Comparative Example No. 5 in case of heating for brazing a core for a heat-exchanger.
Figure 10:
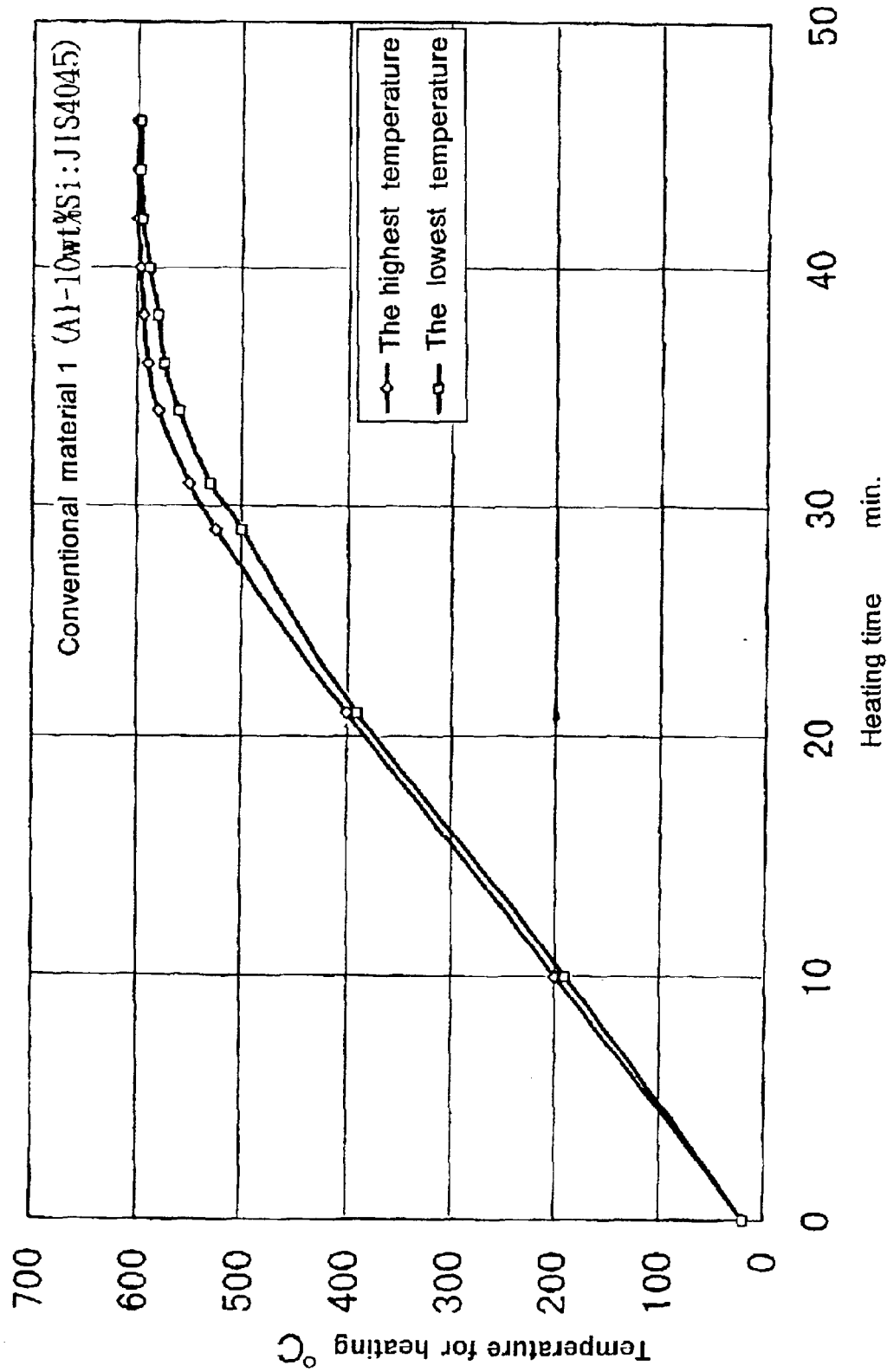
FIG. 10 is a conventional temperature pattern in case of heating for brazing a core for a heat-exchanger.

| Classification | No. | Filler alloy No. | Pattern of heating | ① Liquidus temperature °C. | ③ The highest temperature reached °C. | ③-① °C. | Heating time for brazing min. | Dimensional irregularity of core | Breakage in fins | Leakage in joint portion | Brazing rate of fin material % |
|---|---|---|---|---|---|---|---|---|---|---|---|
| Example according to this invention | 1 | A | FIG. 3 | 387 | 550 | 163 | 22 | none | none | none | 100 |
| | 2 | A | FIG. 4 | 387 | 450 | 63 | 25 | none | none | none | 100 |
| | 3 | B | FIG. 3 | 423 | 550 | 127 | 22 | none | none | none | 100 |
| | 4 | C | FIG. 5 | 530 | 580 | 50 | 34 | none | none | none | 100 |
| Comparative example | 1 | A | FIG. 6 | 387 | 400 | 13 | 37 | none | none | none | 100 |
| | 2 | B | FIG. 7 | 423 | 595 | 172 | 26 | none | present | none | 100 |
| | 3 | C | FIG. 8 | 530 | 560 | 30 | 44 | none | none | none | 100 |
| | 4 | D | FIG. 3 | 360 | 550 | 190 | 22 | present | none | none | 100 |
| | 5 | E | FIG. 9 | 558 | 580 | 22 | 48 | none | none | none | 100 |
| | 6 | E | FIG. 7 | 558 | 595 | 37 | 26 | none | present | present | 65 |
| | 7 | F | FIG. 7 | 590 | 595 | 5 | 26 | none | none | present | 30 |
| Conventional material | 1 | F | FIG. 10 | 590 | 600 | 10 | 46 | none | none | none | 100 |

As is evident from Table 2, Example Nos. 1 to 4 according to the present invention showed significantly shortened heating time for brazing as compared with No. 1 of the conventional product. Further, Example Nos. 1 to 4 of the present invention showed no abnormality in dimensions of the core, no destruction of the fin, and no leakage in the joint portion of the header pipe and the tube, and the core for heat-exchanger of a good quality showing a brazing rate for the fin of 100% was obtained.

On the contrary, a difference of temperature between the highest temperature reached and the liquidus temperature of the filler alloy is lower than 40° C. in Comparative Example Nos. 1 and 3. Therefore, the both heating time for brazing becomes longer in Comparative Example No. 1 as compared with Example Nos. 1 and 2 according to the present invention wherein the same filler alloy was used, and in Comparative Example No. 3 as compared with Example No. 4 according to the present invention wherein the same filler alloy was used. In Comparative Example No. 5, because the liquidus temperature of the filler alloy used exceeded 540° C., the heating time for brazing becomes longer. Although Comparative Example Nos. 2, 4, 5 and 6 were examples wherein a rapid heating was carried out, in Comparative Example No. 2, the highest temperature reached exceeded 585° C. so that destruction of the fin in the fillet portion, in Comparative Example No. 4, a difference of temperature between the liquidus temperature and the solidus temperature of the filler alloy used exceeded 100° C. so that strain in the core formed and dimensional abnormality of the product were caused, in Comparative Example No. 5, the liquidus temperature of the filler alloy used exceeded 540° C., the highest temperature reached exceeded 585° C., and a difference of temperature between the highest temperature reached and the liquidus temperature of the filler alloy used was lower than 40° C. so that destruction of fin and leakage in the joint portion were caused, and decrease in the brazing rate between the fin and the tube as a result of insufficient heating in the portion where the temperature was lowest, and in Comparative Example No. 6, the liquidus temperature and the highest temperature reached of the filler alloy used were too high and a difference of temperature between the highest temperature reached so that the liquidus temperature was too small allows the distribution of temperature in the core to become wider, thus resulting in that a non-melted portion of the filler alloy was generated around the lowest temperature area so that brazing was not completely effected, leakage was generated in the joint portion, and further the brazing rate between the fin and the tube was deteriorated. The conventional product No. 1 was an article brazed under conventional brazing conditions with a conventionally usual filler alloy (4045 Alloy), and is obviously longer in heating time for brazing as compared with Examples according to the present invention.

Example 2

Figure 11:
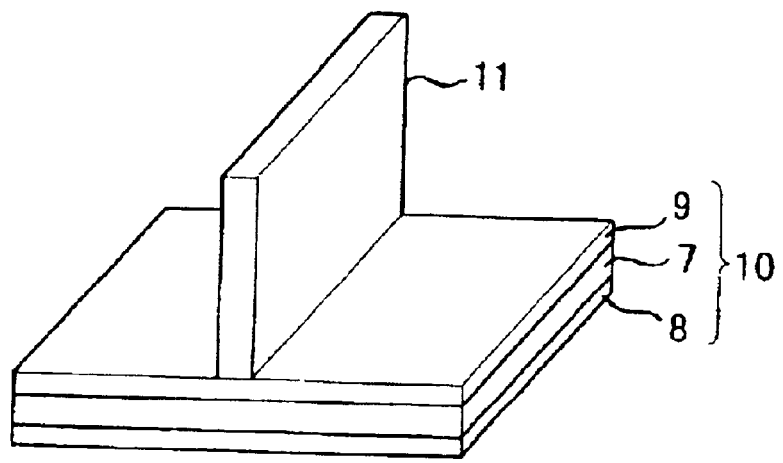
FIG. 11 is a perspective explanatory view showing a brazed part for a brazing test wherein the filler alloy according to the present invention is used.

As shown in FIG. 11, a brazing sheet 10 was prepared by rolling joint a sacrificial material (JIS 7072 Alloy of Al—Zn series) 8 in a thickness ratio of 10% onto one side of a core alloy (JIS 3003 Alloy of Al—Mn series) 7 and laminarly applying a filler alloy usable at low temperature, having a composition defined in the present invention, 9 powder (atomized powder of an average particle size of 35 μm) incorporated with an organic binder onto the other side of the core material. A JIS 3003 Alloy plate 11 was brought into contact perpendicularly on the filler alloy usable at low temperature 9 layer of the brazing sheet 10, and the contact portion was coated with Cs flux. This structure was kept for 10 minutes in a furnace in nitrogen gas atmosphere kept at a temperature by 5° C. higher than the liquidus temperature whereby the brazing sheet 10 and the JIS 3003 Alloy plate 11 were brazed.

Comparative Example 2

The brazing sheet and the JIS 3003 Alloy plate were brazed in the same manner as described in Example 1 except that the composition of the filler powder was outside the scope of the present invention.

Comparative Example 3

A brazing sheet was prepared by roll pressing a sacrificial material (JIS 7072 Alloy) on one side of a core alloy (JIS 3003 Alloy) and filler (JIS 4343 Alloy) on the other side of the core alloy. A JIS 3003 Alloy plate was brought into contact perpendicularly on the filler alloy of the brazing sheet and the contact portion was applied with non-corrosive flux of KF—$AlF_3$ series. This was kept in a furnace in nitrogen gas atmosphere at 597° C. for 3 minutes to braze the brazing sheet and the JIS 3003 Alloy plate.

Concerning the individual brazed member obtained in Example 2 and Comparative Examples 2 and 3, the shape of fillet and the gap-filling length of the filler alloy (showing fluidity of the filler alloy) were investigated. In the brazing sheets, diffusion distance of Zn in the sacrificial material into the core alloy was investigated according to EPMA.

Example 3

Figure 12:
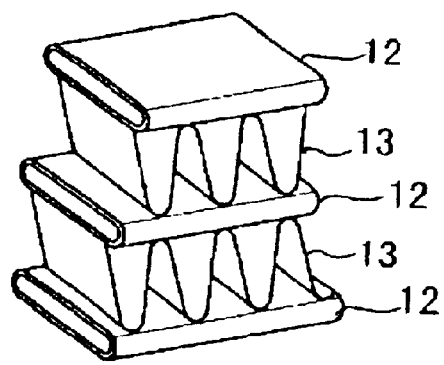
FIG. 12 is a perspective explanatory view showing a brazed article for a brine-spraying test wherein the filler alloy according to the present invention is used.

A composite plate (0.25 mm in thickness) prepared by roll jointing a sacrificial material (JIS 7072 Alloy) on one side of a core alloy (JIS 3003 Alloy) at a thickness ratio of 10% was subjected to seam brazing while turning the core alloy front side to form a pipe material having a length of 150 mm. A filler alloy powder having a composition defined in the present invention was incorporated with an organic binder and applied on the surface of the pipe material and the pipe material formed a tube. As shown in FIG. 12, a plurality of the pipes are arranged in parallel and a corrugated fin (JIS 3003 Alloy+Zn of 1 wt %) of 70 μm in thickness was placed between each tube 12, the whole structure was fixed with a jig and kept for 10 minutes in a furnace in nitrogen gas atmosphere at a temperature by 5° C. higher than the liquidus temperature to braze the tube 12 and the fin 13.

a core alloy (JIS 3003 Alloy) and a filler alloy (JIS 4343 Alloy) on the other side of the core alloy, and non-corrosive flux of KF—$AlF_3$ series as flux, a tube and a fin were brazed in the same manner as illustrated in Example 3 except that the resultant tube was kept for 3 minutes in a furnace in nitrogen gas atmosphere kept at 597° C.

Figure 13:
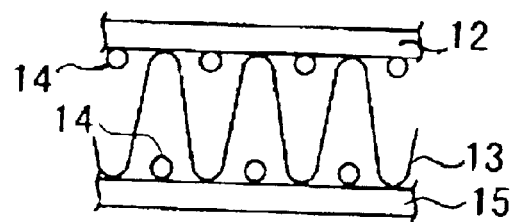
FIG. 13 is a longitudinal cross sectional view showing a tensile testing method of the brazed article after the brine-spraying test.

A brine-spraying test was carried out in accordance with JIS Z2371 for 100 hours for each of the brazed tube and fin products obtained in Example 3 and Comparative Examples 4 and 5, and the tested products were subjected to a tensile test. As shown in FIG. 13, the tensile test was carried out by passing iron pins 14 between mountains of a fin 13 on the side of a tube 12 in such manner that each pin was passed between mountains and 4 pins in total were passed (a set of 4 pins), while passing iron pins 14 between mountains of a fin 13 on the side of a tube 15 in such manner that each pin was passed between mountains and 3 pins in total were passed (a set of 3 pins), and fixing the set of 4 pins while drawing the set of 3 pins downward. In case breakage took place in the fin portion 2, anti-corrosive property in the brazed portion was evaluated as good, while in case breakage took place in the brazed portion, anti-corrosive property in the brazed portion was evaluated as no good. Further, anti-corrosive property of the tube after the brine-spraying test was judged by absence or presence of pinholes.

Table 3 show the results of Examples 2 and 3, and Comparative Examples 2 to 5. Table 3 also shows the composition of the filler alloy powders and the liquidus temperatures and the solidus temperatures obtained according to thermal analysis.

TABLE 3

| Classification | No. | Composition of filler alloy wt % | | | | Liquidus temperature of filler alloy ° C. | Solidus temperature of filler alloy ° C. | Shape of fillet | Gap-filling length mm | * Diffusion distance of Zn μm | Broken portion by tensile test after brine-spraying test | Pinholes on tube after brine-spraying test |
|---|---|---|---|---|---|---|---|---|---|---|---|---|
| | | Si | Cu | Zn | Al | | | | | | | |
| Example according to this invention | 5 | 5 | 22 | 10 | Balance | 520 | 489 | Good | 33 | 21 | Fin portion | none |
| | 6 | 7 | 24 | 10 | Balance | 516 | 481 | Good | 27 | 30 | Fin portion | none |
| | 7 | 5 | 24 | 10 | Balance | 513 | 481 | Good | 24 | 27 | Fin portion | none |
| | 8 | 5 | 22 | 19 | Balance | 501 | 444 | Good | 28 | 23 | Fin portion | none |
| | 9 | 5 | 24 | 20 | Balance | 499 | 450 | Good | 25 | 24 | Fin portion | none |
| Comparative example | 8 | 7 | 8 | 20 | Balance | 542 | 474 | Good | 26 | 21 | Brazed portion | none |
| | 9 | 9 | 10 | 20 | Balance | 529 | 454 | No Good | 11 | 19 | Brazed portion | none |
| | 10 | 10 | — | — | Balance | 592 | 571 | Good | 29 | 95 | Fin portion | present |

* Diffusion distance of Zn in the sacrificial material into the core alloy. The comparative example Nos. 8 and 9 were the comparative examples 2 and 4, and the comparative example No. 10 was the comparative examples 3 and 5.

Comparative Example 4

A tube and a fin were brazed in the same manner as Example 2 except that the composition of the filler alloy powder was outside the definition of the present invention.

Comparative Example 5

Using a conventional brazing sheet obtained by roll jointing a sacrificial material (JIS 7072 Alloy) on one side of As is evident from Table 3, the product using the filler alloys according to the present invention (Nos. 5 to 9) were all good in the shape of fillet and the gap-filling length was long, or in other words, melt fluidity of the molten filler was good, and diffusion distance of Zn in the sacrificial material into the core alloy was short. In the tensile test after the brine-spraying test, breakage took place in the fin portion, thus showing good anti-corrosive property of the filler alloy.

Further a diffusion of Zn into the core alloy was so small that the tube was excellent in anti-corrosive property.

In contrast, No. 8 of Comparative Example was smaller in Cu and No. 9 of Comparative Example was larger in Si, so that the effect for making corrosion potential higher of Cu was not sufficiently obtained and in both the examples, the brazed portions were subjected to corrosion and abrasion, and breakage took place in the brazed portion. As No. 10 of Comparative Example (the conventional material) was higher in temperature for brazing (the melting point of the filler) so that a large amount of Zn in the sacrificial material was diffused to the core alloy to deteriorate its anti-corrosive property thus showing generation of pinhole in the tube after the brine-spraying test.

In comparison of the time required for brazing (the time for keeping in a furnace including the time for elevation of temperature and depression of temperature), in the case of using the filler alloy in the present invention (Example 3 according to the present invention), it was about one hour per cycle on account of the temperature for brazing being about 520° C. In contrast to this, the conventional method (Comparative Example 5) where the temperature for brazing was as high as 600° C. was about 1.3 hours per cycle in time for brazing. Thus, the filler alloy of the present invention is lower in melting point and can suppress the temperature for brazing to about 520° C. so that the working time for brazing can be shortened.

As the temperature for brazing in the present invention can be suppressed to about 520° C., Mn is never again formed a solid solution to deteriorate thermal conductivity of the core alloy at the time of brazing, or alternatively, Mg is never diffused on the surface to deteriorate the function of the flux. Further, the solidus temperature of the core alloy is never depressed to 530° C. or lower, even if Cu and Mg are added to the core alloy to increase strength or even if Si is introduced by the use of a recycled material, so that increase in strength of the core alloy or the use of a recycled material for the core alloy is possible.

INDUSTRIAL APPLICABILITY

According to the brazing method of the present invention, the heating time for brazing aluminum alloy-assembled articles can remarkably be shortened. Additionally, the filler alloy usable at low temperature of the present invention wherein Cu capable of making corrosion potential higher is contained in an adequate amount in opposition to Zn capable of deteriorating corrosion potential and wherein the content of Si capable of inhibiting the effect of Cu is suppressed to less than 8.0 wt %, is excellent in anti-corrosive property and stably obtain good brazing property even under a corrosive circumstance. As the temperature for brazing can be lowered, various problems in filler alloy usable at high temperature, such as a problem that Zn in the sacrificial material of the brazing sheet is diffused to the core alloy to deteriorate anti-corrosive property of the core alloy, can wholly be solved and the working time for brazing can be shortened.

Accordingly, the present invention achieves a significant effect in industry.

Having described our invention as related to the present embodiments, it is our intention that the invention not be limited by any of the details of the description, unless otherwise specified, but rather be construed broadly within its spirit and scope as set out in the accompanying claims.

What is claimed is:

1. A method for brazing aluminum alloy-assembled articles within a short period of time, wherein an Al alloy having a liquidus temperature of 540° C. or lower and a difference of temperature between the liquidus and the solidus temperature being 100° C. or lower and containing approximately 6.0 wt % of Si, 25.0 wt % of Cu, and 5.0 wt % of Zn is used as the filler alloy, wherein the highest temperature reached in the assembled articles at the time of heating for brazing is set 40° C. or more higher than the liquidus temperature but 585° C. or lower.

2. A method for brazing aluminum alloy-assembled articles within a short period of time, which comprises brazing aluminum alloy-assembled articles with a filler alloy of Al—Si—Cu—Zn series having a liquidus temperature of 540° C. or lower and a difference of temperature between the liquidus and the solidus temperature being 100° C. or lower, wherein the highest temperature reached in the assembled articles at the time of heating for brazing is set 40° C. or more higher than the liquidus temperature but 585° C. or lower, wherein the filler alloy is usable at low temperature for brazing, and comprises Si in an amount of 4.0 wt % or more but less than 8.0 wt %, Zn in an amount of 7.0 wt % or more but 20.0 wt % or less and Cu in an amount of 10.0 wt % or more but 35.0 wt % or less, with the balance being made of aluminum and any unavoidable impurities.

3. A method for brazing aluminum alloy-assembled articles within a short period of time, which comprises brazing aluminum alloy-assembled articles with a filler alloy of Al—Si—Cu—Zn series having a liquidus temperature of 540° C. or lower and a difference of temperature between the liquidus and the solidus temperature being 100° C. or lower, wherein the highest temperature reached in the assembled articles at the time of heating for brazing is set 40° C. or more higher than the liquidus temperature but 585° C. or lower, wherein the filler alloy is usable at low temperature for brazing, and comprises Si in an amount of 5.0 wt % or more but less than 7.0 wt %, Zn in an amount of 9.0 wt % or more but 20.0 wt % or less and Cu in an amount of 19.0 wt % or more but 27.0 wt % or less, with the balance being made of aluminum and any unavoidable impurities.

* * * * *